UNITED STATES PATENT OFFICE.

WILLIAM WHEELER HUBBELL, OF PHILADELPHIA, PENNSYLVANIA.

IMPROVEMENT IN REFINING IRON.

Specification forming part of Letters Patent No. 150,042, dated April 21, 1874; application filed April 2, 1874.

*To all whom it may concern:*

Be it known that I, WILLIAM WHEELER HUBBELL, of Philadelphia, Pennsylvania, have invented an Improved Process of Purifying and Strengthening Iron, to form a welded cast-iron when solidified in a mold, of which the following is a specification:

My present invention is an improvement upon the process of smelting and refining iron patented by me on the 8th of February, 1870, reference being had to the specification and drawing annexed to said patent, of record in Patent Office.

The nature of my present invention consists in the process of purifying and strengthening the iron, consisting of the treatment of the particles of the molten mass of iron and of melting iron, in the furnace or a separate receiver, with borate of soda or borax pulverized, nitrate of potash pulverized, and atmospheric air, in the manner herein described. The nitrate of potash purifies, and the borax strengthens, the iron.

The manner of using the nitrate of potash to refine or purify the iron in the furnace is fully described in the specification of my said patent of 8th of February, 1870, but is not combined with the present strengthening process.

The present improved process to strengthen the iron is varied somewhat in degree, according to the quality of the iron to be acted upon and the quality desired to be produced, and is to be carried on wholly or partly, as will be described, as the iron is to be more or less purified and strengthened, at one smelting, or in successive smeltings. The process of strengthening the iron consists in forcing pulverized borax, with and by means of atmospheric air, in direct contact with the particles of the melting iron in the furnace, and into or among the particles of the mass of molten iron in the furnace, and in a separate receiver, the iron having been sufficiently refined or purified by any process, thereby giving it great strength when cast into a mold; also, of purifying and strengthening the iron by forcing a compound of pulverized nitrate of potash or its equivalent, and pulverized borax or its equivalent, with and by means of the atmospheric air, into the particles of melting iron and molten mass of iron in the smelting-furnace, to both refine or purify and to strengthen the iron, as described herein more particularly.

I carry the process into effect in several ways. I supply some of the pulverized borax within cast-iron cases, placed with the iron and fuel inside of the furnace in charging it, to melt at the fusion-point in the furnace, and the borax be scattered by the air-blast among the particles of melting or melted iron. Also, I mix or compound pulverized nitrate of potash and pulverized borax and force them, with and by the atmospheric air, through the feed-tube *e* and tuyere, as the niter alone is supplied, described in my said patent of February 8, 1870, and unnecessary to be repeated in detail here. Also, I force the pulverized borax, by and with atmospheric air, into and among the particles of the molten mass of iron when drawn off from the furnace into a separate receiver, and thus most effectually both purify and strengthen the iron when cast into a mold.

The manner of supplying the pulverized borate of soda to the air-pipes, blast-pipes, or tuyeres is by means of the tube *e*, described in my said patent for smelting and refining iron, to enable the passing current of air to suck or draw the pulverized salts into the air-pipe or tuyere and force it into the furnace. When the borate of soda is supplied in shells or cases, the filling-hole of the shell or case is stopped with clay, and each case is about half an inch thick, and contains about four pounds of the borate of soda. At the same time nitrate of potash or nitrate of soda is supplied by the tube, as described by the specification of the patent of 8th of February, 1870; and a portion of borate of soda should be mixed with the nitrate of potash—about one part of borate of soda to two parts of nitrate of potash—supplied through the air-pipes, and two parts of borate of soda in the cast-iron shells or cases. A proportion of twenty pounds of nitrate of potash, mixed with ten pounds of borate of soda, and supplied through the air-tube, and with twenty pounds of borate of soda in the cast-iron cases inside of the furnace, to each ton of iron of two thousand two hundred and forty pounds is a good proportion; but these proportions may be changed, and increased or diminished in quantity, to suit different irons and mixtures of irons, and different degrees of refining and strengthening required.

The iron is refined by the oxygen of the niter combining with the carbon, sulphur, and phosphorus, and burning them out, and the borate of soda combines with the silica, which separates from the iron in a flux, and the alkaline matter prevents oxidation of the granules of the iron, and causes them to weld or form into a welded cast-iron of great purity, density, and very great tensile strength.

Carbonate of soda may be used in the cases or air-tube; but it is inferior to borate of soda in forming a flux with the silica to free the granules of the iron and make them weld.

I supply the nitrate of potash and borate of soda or borax mixed together, with the atmospheric air, by means of the feed-tube $e$ and tuyere, described in my said patent No. 99,677, dated 8th February, 1870, because the supply is in small particles or quantity at a time, and acts immediately, and cannot produce an explosion; but the borax is supplied alone, without the niter, inside of the iron cases set within the furnace, because the niter, if supplied in these cases inside of the furnace, would prematurely blow out, by development into oxygen gas in heating, or cause an explosion. To force the pulverized borax, with the air, among the molten particles of iron, held in a receiver separate from the furnace, I feed the pulverized borax, with a slide or measure, from a box into an air-pipe leading to near the bottom of a receiver containing the molten iron, and the pulverized borax is, by and with the air, forced into the particles thereof, to further strengthen the iron; and at this operation pulverized niter, in a small quantity, is also mixed with the borax, and forced by the air with it, to further purify the iron, if it is not previously sufficiently purified. The sliding measure is a flat piece of iron about six inches square, with a cavity one inch wide and three inches long, cut through it in the middle. It slides between horizontal plates under the box of pulverized salts, to receive the borax and niter, and then forward between the plates of sufficient width into the air-tube extending down, and the air, passing down through the aperture, carries the pulverized salts with it into the molten iron. The iron must be nearly pure to strengthen it most effectually by this process, with air and pulverized borax; and any other process of purifying it, besides the use of niter, may be employed with the air and pulverized borax. The air itself also purifies it some, or the iron may be previously purified. To slightly carbonize the iron when desired, supply the carbon by pulverized charcoal or other material, with the air, through the feeding-slide into the iron in the receiver, or otherwise carbonize it in any of the well-known methods.

It is unnecessary here to repeat the disclaimer contained in my said patent of 8th February, 1870; neither do I claim borax to weld bodies of iron or steel, as it has been long used to aid in the welding of bodies of iron and steel in making tools and machinery; but I have discovered that a sufficient quantity of pulverized borax forced among the particles of a molten mass of purified iron, with and by means of atmospheric air, will cause the granules of iron in the act of solidifying to weld or unite with great adherence, and form a cast-iron of superior tensile strength.

I claim as my invention—

1. The process of strengthening iron, consisting in forcing pulverized borax, with and by means of atmospheric air, among the particles of molten iron within the furnace or a receiver, substantially as described.

2. The process of purifying and strengthening iron, consisting in forcing a mixture of nitrate of potash and borax pulverized, with and by means of atmospheric air, among the particles of molten iron within the furnace or receiver, substantially as described.

3. The process of strengthening iron, consisting in forcing the pulverized borax, with and by means of the atmospheric air, into or among the particles of molten iron within the furnace, the borax also being supplied within fusible cast-iron cases inside of the furnace among the fuel and iron, substantially as described.

4. The combined process of purifying and strengthening iron, consisting in forcing the nitrate of potash or a compound of pulverized borax and nitrate of potash, with and by means of the atmospheric air, from the outside through the feed-tube and tuyere, and from the inside within and by means of the iron cases containing borax alone, into and among the molten iron within the furnace, substantially as described.

5. The combined process of purifying and strengthening iron, consisting in forcing the pulverized nitrate of potash and pulverized borax mixed, with and by means of atmospheric air, into the furnace, and with the fusible iron cases containing the borax within the furnace, among the particles of molten iron, and in forcing pulverized borax with the air among the particles of the molten iron contained in a separate receiver, substantially as described.

6. The process of strengthening iron, consisting in supplying borax, within fusible cast-iron cases inside of the furnace, to and forcing it among the particles of molten iron, with and by means of the atmospheric air, substantially as described.

WM. WHEELER HUBBELL.

Witnesses:
 HENRY H. BURTON,
 A. E. BEECHER.